United States Patent [19]

Borrmann

[11] Patent Number: 4,910,445
[45] Date of Patent: Mar. 20, 1990

[54] ACTUATING DEVICE FOR MOVABLE PARTS FOR CLOSING OF APERTURES IN VEHICLES AND VEHICLE ROOF UTILIZING SAME

[75] Inventor: Hans-Achim Borrmann, Kaltental, Fed. Rep. of Germany

[73] Assignee: Webasto AG Fahrzeugtechnik, Gauting, Fed. Rep. of Germany

[21] Appl. No.: 320,555

[22] Filed: Mar. 8, 1989

Related U.S. Application Data

[63] Continuation-in-part of Ser. No. 239,995, Sep. 2, 1988.

[30] Foreign Application Priority Data

Sep. 8, 1987 [DE] Fed. Rep. of Germany ....... 3730034

[51] Int. Cl.$^4$ ............................................. B60J 7/057
[52] U.S. Cl. .................................. 318/468; 318/266; 318/286
[58] Field of Search ............... 318/255, 256, 264, 265, 318/266, 280, 286, 466, 467, 468

[56] References Cited

U.S. PATENT DOCUMENTS

| | | | |
|---|---|---|---|
| 3,572,822 | 3/1971 | Schmid . | |
| 3,702,430 | 11/1972 | Knetsch . | |
| 4,070,607 | 1/1977 | Mitterer . | |
| 4,164,692 | 8/1979 | Mitterer et al. | 318/468 X |
| 4,272,708 | 6/1981 | Carle et al. | 318/286 X |
| 4,394,605 | 7/1983 | Terazawa | 318/256 X |
| 4,502,726 | 3/1985 | Adams . | |

FOREIGN PATENT DOCUMENTS 1261846 1/1972 United Kingdom .

*Primary Examiner*—Bentsu Ro
*Attorney, Agent, or Firm*—Sixbey, Friedman, Leedom & Ferguson

[57] ABSTRACT

Actuating device for movable parts, such for closure parts for apertures in vehicles, having a reversible direct current drive motor, a polarity reversing actuating switch in the motor circuit for applying direct current to the motor circuit with a polarization corresponding to the desired motor rotational direction; a relay with a switch contact in the motor circuit which is in series with the polarity reversing switch; and further, having a position responsive switch connected with the relay control circuit for actuating the relay in a reference position of the movable parts, for the purpose of deactivating the drive motor by opening the switch contact. The relay is a direct current relay, which, upon application of a first or second voltage level at its control circuit, closes or, respectively, opens the switch contact. Connected with the relay control circuit, there is an electronic relay actuating stage with a storage capability, with stage, upon closing of the polarity reversing actuating switch in either direction, at least when the movable part is in the reference position, has applied a setting signal to an input thereof, in response to which setting signal the relay actuating stage applied the first voltage level to the relay control circuit, at least until the movable part has left the reference position.

23 Claims, 4 Drawing Sheets

ACTUATING DEVICE FOR MOVABLE PARTS FOR CLOSING OF APERTURES IN VEHICLES AND VEHICLE ROOF UTILIZING SAME

BACKGROUND OF THE INVENTION

This application is a continuation-in-part of copending application Ser. No. 239,995, filed Sept. 2, 1988.

The invention relates to an actuating device for movable closure parts for apertures in vehicles, like windows, doors, or roof openings, and having a direct current drive motor which is reversible in rotational direction, for driving the movable part, a polarity reversing activating switch in the motor circuit for selectively applying a direct current to the motor circuit of a polarity which selectively produces rotation of the motor in each of opposite rotational directions of the motor, a relay having a switch contact connected in series with the polarity reversing actuating switch in the motor circuit, and furthermore, having a position responsive stage, communicating with the control circuit of the relay for activating the relay in a predetermined reference position of the movable part, for the purpose of automatic deactivation of the drive motor in this reference position by the opening of the switch contact. The invention also relates to a vehicle roof utilizing such an actuating device for controlling movement of a cover for a roof opening in a fixed roof surface.

Known actuating devices of this kind for vehicle roofs (U.S. Pat. No. 3,702,430 and U.S. Pat. No. 4,070,607) have a relay which is designed as an impulse relay, i.e., a relay whose mechanical layout is such that the switch contact of the relay, upon receipt of each impulse, changes its switch position between the two positions possible, and remains in the respective switch position until application of the next impulse. An actuating device of this kind is superior to other known arrangements in that it does not require more than a single relay. However, in actuating devices equipped with an impulse relay as described in the prior art, there is the drawback of relatively loud switching noises. Moreover, the reaction time achieved is undesirably long, which causes problems with rapidly moving parts as there is the danger that, when the drive element reaches the reference position, it may not stop quickly enough, and, accordingly, the reference position might be overrun.

In U.S. Pat. No. 4,502,726, a control apparatus for a pivotal/sliding roof is disclosed that is energizable by the activation of a first switch, which connects electrical power to the electric drive motor in one of two opposite polarities, and the output of a sensor, that detects when the closed position of a movable roof panel is reached, to disconnect the drive motor from the source of electrical power. Furthermore, a switchable member momentarily energizes the control device, responsive to sequential deactivation and reactivation of the first switch in order to initially move the roof panel from the closed position. However, since this momentary energization terminates upon expiration of a predetermined time period which is set by the time required to charge a capacitor of an RC network, if an increased resistance to movement is encountered, e.g., due to low outside temperatures, so that the roof panel is still in the closed position upon expiration of the predetermined time, another sequential deactivation and reactivation of the first switch will be required for the switchable member to again energize the control device. Thus, a functional reliability problem exists.

SUMMARY OF THE INVENTION

It is the primary objective of the invention to provide an actuating device which, while retaining the advantage of single relay use, adds the benefit of reducing the switching noises and, furthermore, offers shorter reaction times as well as a particularly high functional reliability.

This objective is achieved in that in an actuating device of the kind described above, the relay employed is a direct current relay which, upon application of a first voltage level to its control circuit, closes the switch contact, and upon application of a second voltage level to its control circuit, opens the switch contact; and further in that the relay control circuit is connected with an electronic relay actuating stage having storage capability. This stage, upon closing of the polarity reversing actuating switch in either direction, at least when said movable part is in the reference position, has a setting signal applied to the input thereof, in response to which setting signal the relay actuating stage applies the first voltage level to the relay control circuit. Furthermore, this set condition of the relay actuating stage is held, as a function of the position of the movable part, at least until the movable part has left the reference position.

The actuating device in accordance with the invention is characterized by a particularly low switch noise level. While reaction times of approximately 200 ms are to be expected in the prior art impulse relay actuating device, the inventive device facilitates reaction times of less than 10 ms. The total space required for the inventive actuating device, even in the case of a switch making and/or breaking capacity increase from 10 A to 30 A is, for example, only equal to, or even less than that of the known actuating device having an impulse relay. Direct current relays of the kind discussed, unlike impulse relays, are available as low-priced, mass-produced products of high quality, thereby keeping the total cost of the inventive actuation device equal to or even lower than that of the conventional impulse relay actuating device. Also, its service life is increased. Also differing from an actuating device with an impulse relay is that the assembly, in accordance with the invention, can be designed to tolerate continuous application of current. Moreover, there is an increased vibration resistance. Furthermore, incorrect actuation caused, e.g., by increased resistance to movement of the movable part, is eliminated.

In a further development of the invention, a reduction of the reaction time is achieved when the position responsive stage causes the relay to release when the movable part enters the reference position, and if the contact switching the drive motor on and off is closed in its working position. The position responsive stage can simply have one switch, e.g., a microswitch, which assumes a first switch position when the movable part is in the reference position, and which assumes a second switch position when the movable part has moved out of the reference position, whereby such a switch can be activated directly by the movable part. However, the switch actuation can also be linked with the travel of the movable part in a different manner.

Generally, position responsive stages of different design can also be used, e.g., position responsive stages having Hall sensors, or the like. A particularly uncomplicated design is obtained when the position responsive switch is directly connected in series with the relay winding. However, the circuit arrangement can also be structured so that the position responsive switch acts upon the relay via the electronic relay actuating stage. Preferably, the relay actuating stage has at least one dynamic input which is connected with the polarity reversing actuating switch.

In a still further development of the invention, the relay actuating stage is provided with a locking loop or self-holding circuit which, after setting, holds the relay actuating stage in its set condition at least until the movable part has left the reference position. A particularly high functional reliability is obtained when the position responsive switch has a changeover contact which connects the output circuit of the relay actuating stage in series with the winding of the relay when the movable part is in its reference position, and which closes a relay holding circuit, that includes the polarity actuating switch, after the movable part has left the reference position. In order to allow, with a relatively simple circuit configuration, control of the relay actuating stage by the polarity reversing switch, independent of the polarization preset by the actuating switch, in accordance with one embodiment of the invention, the relay actuating stage, advantageously, can be connected via a full wave rectifier to the polarity reversing actuating switch in parallel to the motor circuit. To this end, the circuitry provides that the position responsive switch is open when the movable part is in the reference position. For transmittal of a resetting signal, the position responsive switch is connected with a static input of the relay actuating stage via a diode, which is kept blocked when the position reversing switch is open.

Normally, the actuating device in the vehicle is exposed to considerable temperature fluctuations, so that the relay actuating stage preferably is equipped with a temperature drift compensation element in its output circuit. When the position responsive switch is open, this element maintains a sufficiently adequate off-state voltage at the diode to provide a reliable blocking thereof, regardless of temperature fluctuations.

In accordance with another embodiment of the invention, the relay actuating stage has two circuit units which essentially are a mirror image of each other; one of which responds to a closing of the polarity reversing actuating switch in one polarization direction, and the other of which responds to a closing of the polarity reversing actuating switch in the other polarization direction. Advantageously, each of the two circuit units has a dynamic setting input directly connected with the polarity reversing actuating switch and, further, has a dynamic resetting input connected with the position responsive stage. In this manner, an inpulse-dependent system is obtained which can be directly exchanged with the conventional impulse relay actuating device, i.e., without having to change leads for the actuating device. The control signal necessary for starting and stopping in both drive directions can be directly initiated mechanically (by switch actuation).

The actuating device of the invention easily facilitates circuit expansion for special operations, such as, for instance, automatic closing in the event of rain.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 3:
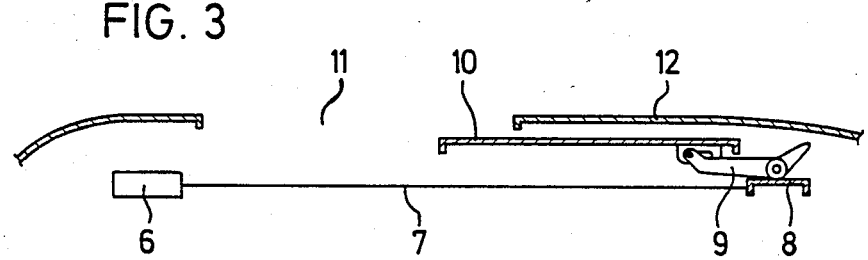
FIG. 3 diagrammatically depicts a sliding/lifting roof controlled by the actuating device according to FIGS. 1 or 2, in an open position.
Figure 4:
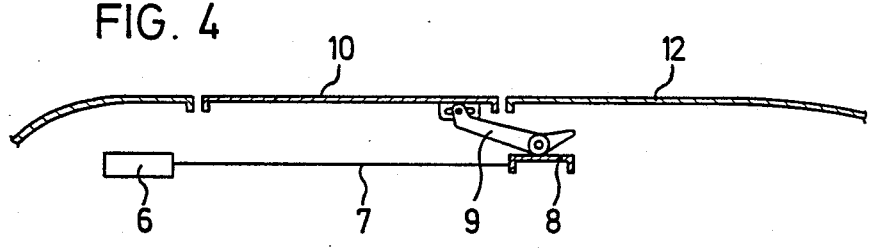
FIG. 4 is a view similar to FIG. 3, but with the sliding/lifting roof in a closed position.
Figure 5:
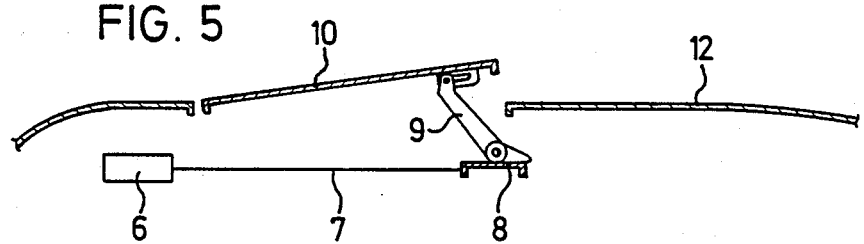
FIG. 5 is a view similar to FIG. 3, but with the sliding/lifting roof in an upwardly extended position.

In the example depicted in the drawings, a direct current drive motor 6, whose rotational direction can be reversed, serves to operate a sliding/lifting roof having a cover 10 which closes, or, alternatively, at least partially exposes a roof aperture 11 disposed in a fixed roof 12 of a vehicle (only roof 12 being shown in FIGS. 3-5). Drive motor 6 displaces, in a conventional manner (British Pat. No. 1,261,846, and as shown manually driven in U.S. Pat. No. 3,572,822), a transport bridge 8 which is slidable in the longitudinal direction of the vehicle, via a cable which is rigid in compression. At both ends of transport bridge 8, there is a lifting lever 9. In response to the displacement of transport bridge 8, levers 9 are induced into pivoting movements in a manner not depicted in detail here. The configuration is such that cover 10, starting from the depicted FIG. 4 closed position, can selectively be lowered and moved rearwardly (FIG. 3) or, alternatively, can be extended into a venting position (FIG. 5) with its rear edge above the surface of the fixed roof 12.

The drive motor 6 has a motor circuit polarity reversing actuation switch S1 with two changeover contacts S11 and S12, that are mechanically coupled to each other. By manual actuation of switch S1, in the embodiments of FIGS. 1 and 6, leads 13 or 14 connected with these contacts, can selectively be connected with the positive and negative sides, or with the negative and positive sides of a direct current source 15, in the form of a motor vehicle battery, for example. By means of a spring mechanism, not depicted, changeover contacts S11 and S12 are automatically reset into the O-position indicated in FIGS. 1 and 2 when switch S1 is released.

Drive motor 6 is disposed between leads 13, 14 in series with a contact rs of a relay RS. Relay contact rs opens the motor circuit, as depicted, with relay RS releasing and closing an inductive braking current extending via lead 16. Relay RS is a conventional direct current relay, which, upon application of a voltage sufficient for its actuation, closes switch contact rs of the motor circuit and brings contact rs into a position (FIG. 1) which causes interruption of the motor circuit when the voltage applied at relay RS drops to a value below the critical value of the relay. When switch contact rs is in its operating position, which closes the motor circuit, the actuation of switch S1 causes voltage with one or the other polarity to be applied to drive motor 6, and in accordance therewith, actuation of the motor is initiated in one or the other rotational direction.

A relay actuating stage, having transistors T1, T2, and T3, together with the control circuit (lead 17) of relay RS, is connected to the changeover contacts S11, S12 of the polarity reversing actuation switch S1 via a full wave bridge rectifier consisting of diodes D1, D2, D3 and D4, connected in parallel with the motor circuit. A lead 19 is connected with the positive outlet 18 of a full wave bridge rectifier, while a lead 21 is connected to the negative outlet 20 of the bridge.

The base of transistor T1 communicates with a lead 19 via a series connection having condenser C1 and resistor R1, and communicates with a lead 21 via a condenser C2. The collector of transistor T1 is connected to lead 19 via a resistor R2, and the emitter of transistor T1 is connected with lead 21 via a resistor R3. If desired, the emitter of transistor T1 can be directly connected to lead 21, i.e., resistor R3 can be dispensed with.

The base of transistor T2 is connected with the collector of transistor T1 via a resistor R7. The collector of transistor T2 is connected to the junction 22 between condenser C1 and resistor R1 via resistor R4, and is connected to lead 19 via resistor R5. The emitter of transistor T2 is directly connected with lead 21.

The base of transistor T3 is connected to the collector of transistor T2 via a resistor R6. The emitter of transistor T3 is connected with lead 21 via a diode D5, which has homopolar polarization relative to the emitter of transistor T3. The collector of transistor T3 is connected with the base of transistor T1 via a diode D6 and is also connected to a junction 23 between the winding of relay RS and a position responsive switch S2.

One side of the relay winding is directly connected with lead 19 via lead 17, while the other side of the relay winding can be connected to lead 21 via switch S2. Depending upon the cover 10 position, the position responsive switch is actuated such that it opens at a predetermined reference position of cover 10, and closes in all other cover positions. In the case of the sliding/lifting roof, illustrated as an example, the reference position is the closed cover position depicted in FIG. 4. A diode D7 is disposed parallel to the relay winding.

Figure 1:
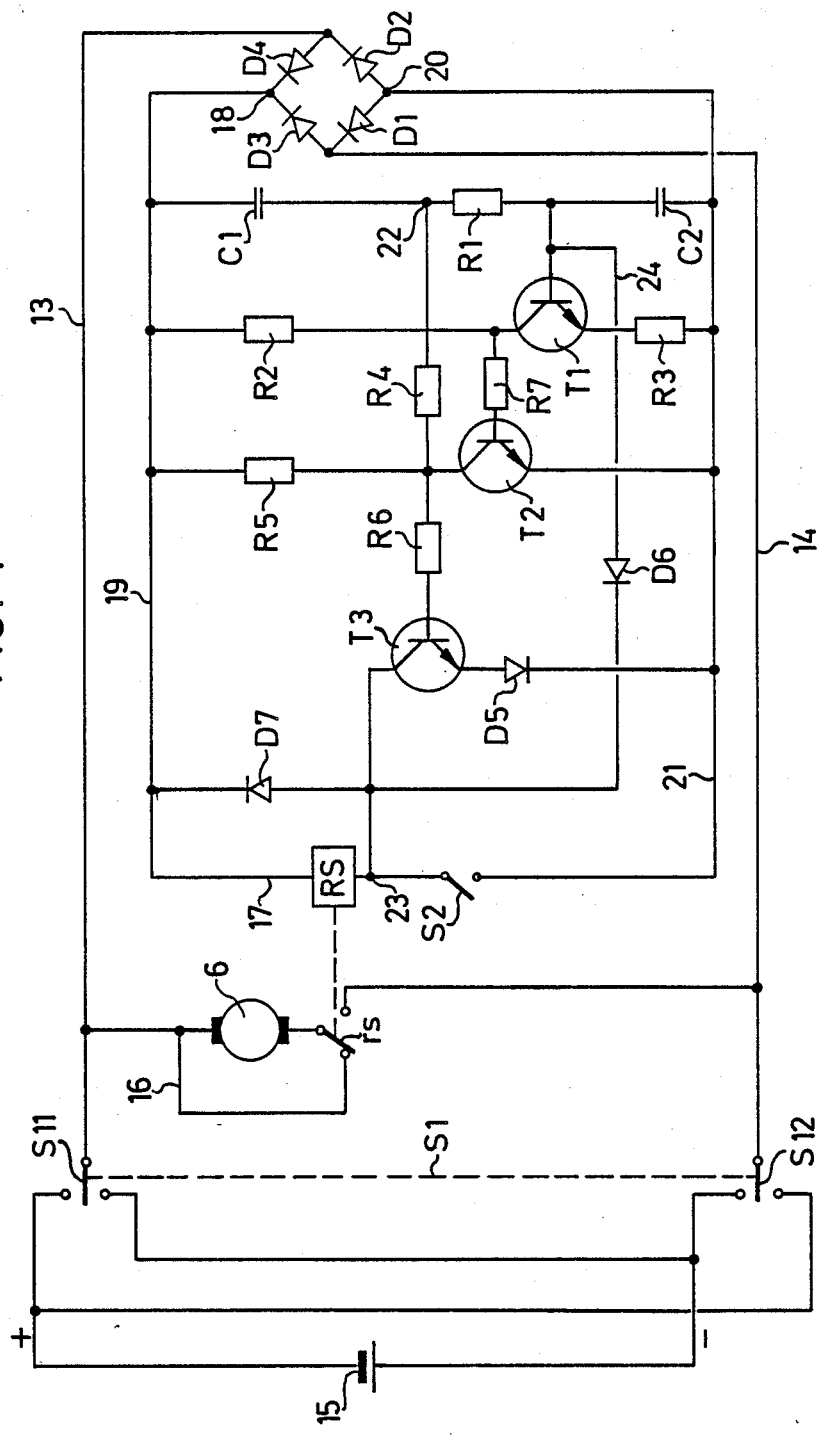
FIG. 1 is a circuit diagram of an actuating device in accordance with a first embodiment of the invention.

For the purpose of illustrating the functioning of the actuation device of FIG. 1, it is to be assumed that cover 10, initially, is in the closed, FIG. 4, position, and actuating switch S1 assumes the depicted O-position wherein: Switch S2 is open, relay RS has released, and the motor circuit is interrupted. Manual actuation of polarity reversing switch S1, in one or the other direction, causes a short-term positive impulse, acting as a setting signal, which is given to transistor base T1 via full wave bridge rectifier D1 to D4, by way of the series connection acting as a dynamic inlet for the relay actuation stage having condenser C1 and resistor R1.

The above sequence causes a low at the output (collector) of transistor T1 which is coupled to the input (base) of transistor T2. Transistor T2, on its part, produces a high at its ouput (collector) which is coupled to transistor base T3 via resistor R6. Transistor T3 fully energizes and causes relay RS to pull-in. Simultaneously, the collector of transistor T2 returns the high to transistor base T1 via the series connection of resistors R4 and R1, whereby resistors R4 and R1 form a locking loop which, subsequent to the relay being set, holds the relay actuation stage in its set mode until there is a resetting, further described below.

The motor circuit is closed via the switch contact rs of the relay. The motor is started in the rotational direction predetermined by the actuating device of switch S1 and displaces cover 10 via drive cable 7. Upon completion of the start-up procedure, position responsive switch S2 is closed as a consequence of the cover movement, whereby relay RS is held in the set mode. At the same time, a resetting signal (low) which originates at junction 23, is coupled back to transistor base T1 via diode D6 and a lead 24. Lead 24 further forms a static input of relay actuation stage T1, T2, T3.

To ensure a reliable functioning of the actuating device, it is essential to ensure that, with the position responsive switch S2 in the open position, diode D6 remains blocked, even when there are large fluctuations in temperature, as occur in motor vehicles. This problem is addressed by diode D5. The effect of the voltage drop across diode D5 in a forward direction, with the position responsive switch S2 in the open position, causes the potential at junction 23, and inherently at the cathode of diode D6, to be elevated to a value which reliably blocks diode D6. A temperature drift occurs equidirectionally in diodes D5 and D6, whereby a potential difference, independent of temperature fluctuations, is obtained at diode D5, reliably blocking diode D6, with switch S2 in the open position. If desired, diode D5 may be part of the collector circuit of transistor T3.

Resistors R4 and R1 serving to feed back the setting function, preferably, should be dimensioned at a ratio of approximately 1:2 to 1:3. In order to effectively decouple the relay driver stage formed by transistor T3 relative to the flip-flop-like pre-stage T1, T2, the resistor R6 should have a relatively high value, which facilitates that the current flowing over transistor T2 is substantially greater than the current flow to the transistor base T3. Preferably, these currents are at a ratio on the order of 10:1. Condenser C2 serves to control chatter at the position responsive switch S2, while diode D7 serves as a resetting diode for relay RS.

Subsequent to cover 10 leaving the reference position, and after position responsive switch S2 has closed, relay actuation stage T1, T2, T3 is reset. Motor 6, in any desired rotational direction, is still only controlled by polarity reversing actuation switch S1. Upon cover 10 moving into the reference position, position responsive switch S2 opens, relay RS is released, contact rs interrupts the motor circuit, and the motor winding is short-circuited via lead 16 for the purpose of inductive braking.

Figure 2:
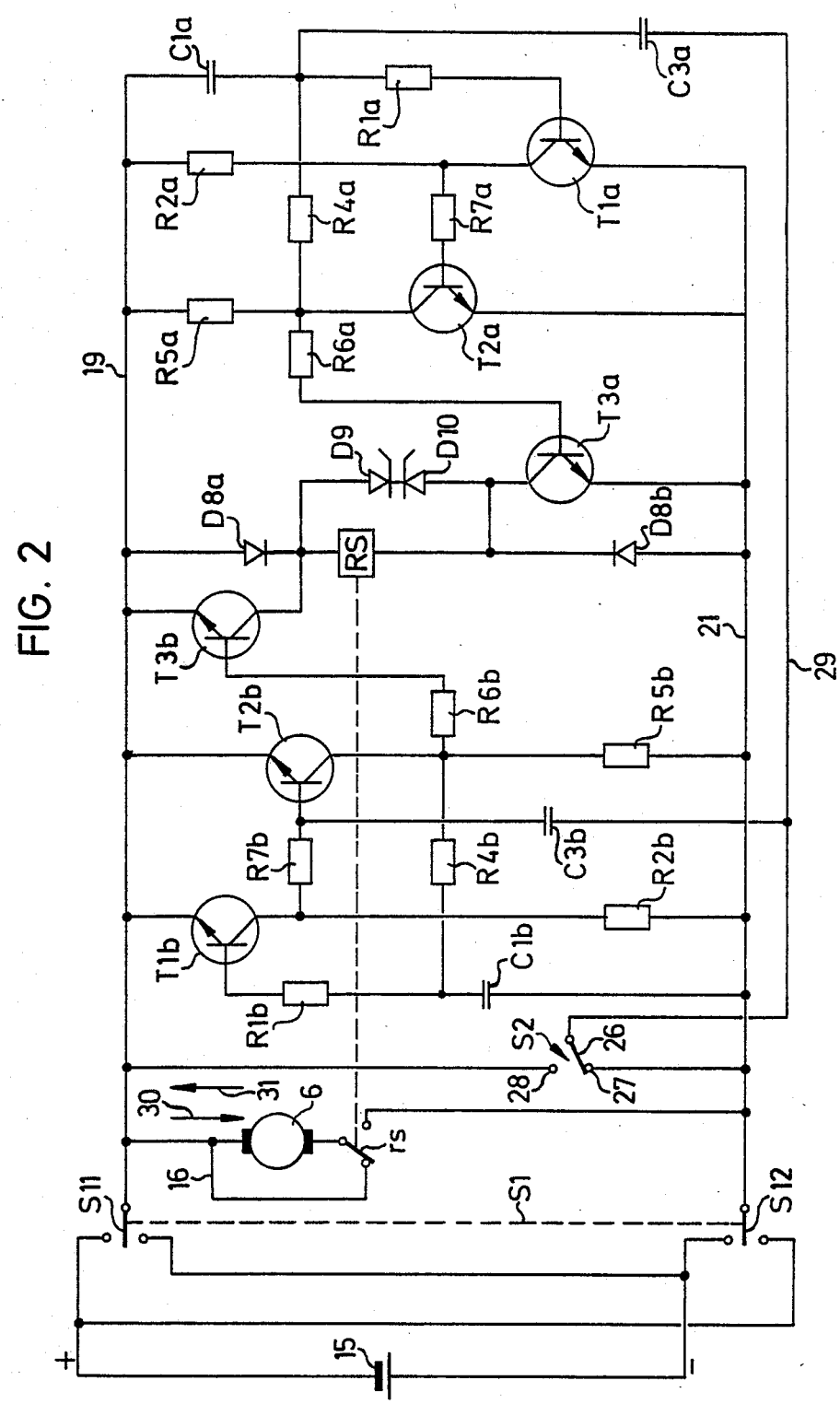
FIG. 2 is a circuit diagram of an actuating device in accordance with a second embodiment of the invention.

In the embodiment according to FIG. 2, the relay actuating stage has two circuit units which are in mirror image relationship with respect to each other, and each of which is similar to the relay actuation stage according to FIG. 1. Corresponding circuit components of the two circuit units have been given identical reference numerals as in FIG. 1, supplemented by the letters "a" or "b", respectively. Leads 19, 21 are directly connected to changeover contacts S11 or S12 of polarity reversing actuating switch S1. The full wave bridge rectifier D1, D2, D3, D4 is eliminated.

The position responsive switch S2 has a changeover contact switching element 26 which, in the reference position of cover 10 (i.e., the closed position of FIG. 4 in the example according to FIGS. 3–5), engages a contact 27 connected with lead 21, and which, upon leaving the reference position, is switched to a contact 28 connected with lead 19. Changeover contact 26 is connected to lead 29 which, by way of condenser C3a, C3b is connected, respectively, with the dynamic input of the two switching units T1a, T2a, T3a and T1b, T2b, T3b.

Diodes D5, D6, and D7 of the FIG. 1 arrangement are eliminated. One side of the winding of relay RS is connected with lead 21 by way of the collector-emitter path of transistor T3a, while the other side of the relay winding is connected to lead 19 via the collector-emitter path of transistor T3b. Parallel to the collector-emitter paths of transistors T3a and T3b there are, respectively, diodes D8b or D8a. Parallel to the winding of relay RS there are two oppositely polarized Z-diodes D9 and D10, which are connected in series. The collector of transistor T1a is connected with the transistor base T2a via a resistor R7a. Analogous thereto, a resistor R7b is connected between the collector of transistor T1b and transistor base T2b.

For illustrating the method of operation, it is assumed that the drive motor displaces transport bridge 8 rearwardly, when changeover contact S11 is connected with the positive terminal of current supply 15, and changeover contact S12 is connected with the negative terminal of current supply 15; while transport bridge 8 is displaced to the front when changeover contact S11 is brought into contact with the positive side of current supply 15. It is further assumed that cover 10, initially, is in the reference position (FIG. 4 closed position), and starting therefrom it can be rearwardly displaced in accordance with FIG. 3, or upwardly tilted as in FIG. 5.

In the closed position of cover 10, the changeover contact 26 of position responsive switch S2 is applied at contact 27. If, at this starting point, actuating switch S1 in FIG. 2 is displaced upwardly, i.e., changeover contact S11 is connected to the positive side, and changeover contact S12 is connected to the negative side of power source 15, a short-term positive impulse is given to transistor base T1a via lead 19 and the dynamic input leading thereto via condenser C1a of the circuit unit of the relay actuation stage, indicated to the right in FIG. 2. The base of this transistor is energized to a high on a short-term basis. The low caused thereby at the collector of the transistor T1a is coupled to the base of transistor T2a via resistor R7a. The collector of transistor T2a goes to a high. This signal is applied at the transistor base T3a which consequently is fully energized. Simultaneously, the high of the collector of transistor T2a is coupled back to the transistor base T1a via the locking loop with resistors R4a and R1a, causing the set mode triggered by the positive impulse at transistor base T1a to be retained.

Starting at the positive side of direct current source 15, current flows to lead 21 via changeover contact S11, diode D8a, the winding of relay RS and the collector emitter path of transistor T3a, and from there to the negative side of direct current source 15 via changeover contact S12. Relay RS pulls-in and is retained in the set state. The relay switch contact rs closes the motor circuit of drive motor 6. The current flows via motor 6 in the direction indicated by arrow 30. The motor 6 starts up; transport bridge 8 is displaced rearwardly via drive cable 7; cover 10 is lowered and is displaced rearwardly in accordance with FIG. 3. During the sequence discussed above, the circuit unit with transistors T1b, T2b, and T3b, depicted to the left in FIG. 2, has been deactivated. As a consequence of the high potential on lead 19, and the low potential on lead 21, transistors T1b, T2b, and T3b are blocked.

Once cover 10 has left the closed position, position responsive switch S2 reverses, the changeover contact 26 is transferred to contact 28 from contact 27. Cover 10 may be stopped in any desired intermediate position by bringing actuating switch S1 into the O-position depicted in FIG. 2 and thereby deenergizing drive motor 6. For the purpose of further displacing cover 10 rearwardly from such an intermediate position, e.g., between the closed, FIG. 4, position and the fully retracted, FIG. 3, position, actuating switch S1 is repositioned so that lead 19 is connected with the positive side of current source 15 via changeover contact S11, and lead 21 is connected with the negative side of current source 15 via changeover contact S12. Via changeover contact 26 of position responsive switch S2, now connected with contact 28, transistor base T1a is positively pulsed by way of the dynamic input formed by condenser C3a, so that relay RS, in the manner discussed above, is caused to be pulled-in and is retained in the pulled-in state.

If cover 10 is to be brought back into the closed position from the fully retracted position, or into an intermediate position between the positions in accordance with FIGS. 3 and 4, the polarity reversing switch S1 in FIG. 2 is shifted downwardly, lead 19 is connected to the negative side of direct current source 15 via changeover contact S11, while lead 21 is connected to the positive side of current source 15 via changeover contact S12. A low impulse is given to the transistor base T2b by way of the dynamic input with transistor C3b via changeover contact S11 and changeover contact 26, applied at contact 28 of the position responsive switch S2. The low at the transistor base T2b leads to a high at the collector of this transistor which is transferred to transistor base T3b via resistor R6b. Transistor T3b is fully energized. Current flows from the positive side of the direct current source 15 via changeover contacts S12, lead 21, diode D8b, the winding of relay RS, fully energized transistor T3b, lead 19, and the changeover contact S11 to the negative side of direct current source 15. Relay RS pulls in. Relay contact rs closes the motor circuit. Current flows through the motor in the direction of arrow 31. Cover 10 is displaced in the direction toward the closed position.

If actuating switch S1 is retained in the position last described, cover 10 will continue its movement until it reaches the closed position of FIG. 4, thereby transferring changeover contact 26 of the position responsive switch S2 from contact 28 to contact 27. Starting from the positive side of current source 15, a reset signal in the form of a positive impulse is given to transistor base T2b via changeover contact S12, position responsive switch S2 and lead 29, by way of the condenser C3b equipped dynamic input of the switch unit, depicted to the left in FIG. 2. The resulting low at the collector of transistor T2b is coupled to the transistor base T3b via resistor R6b. Transistor T3b is blocked. Due to transistor T3b being blocked, relay RS is released. The changeover contact rs opens the motor circuit and activates the inductive brake via lead 16. Cover 10 is instantaneously stopped. The low signal originating from the outlet of transistor T2b is coupled back to the transistor base T1b, via resistors R4b and R1b, which causes the left circuit unit of the relay actuating stage with transistors T1b, T2b and T3b to be held in the reset state. When actuation switch S1 is released and thus caused to return to its O-position, transistor T2b is also deenergized.

In order to execute an extension of cover 10 into the FIG. 5 position, starting from the closed, FIG. 4, position, actuation switch S1 in FIG. 2 is reset downwardly. A setting signal in the form of a short-term positive impulse goes from the positive side of direct current source 15 to the dynamic inlet via condenser C1 by way of changeover contact R12, causing transistor T1b to be fully energized. The low at the collector of transistor T1b causes a high at the collector of transistor T2b. This signal is coupled back to the base of transistor T1b via resistor R4b and R1b, further fully energizing transistor T3b. Current flows from lead 21 to lead 19 via diode D8b, the winding of relay RS, and the fully energized transistor T3b. The motor circuit is closed by relay contact rs. Motor 6 is provided with current in the direction of arrow 31. Transport bridge 8 is pulled further forward by drive cable 7, and cover 10 is tilted or extended. After start-up, changeover contact 26 of position responsive switch S2 is transferred from contact 27 to contact 28.

If lead 19 is connected with the positive side of current source 15, and lead 21 is connected with the negative side thereof via polarity reversing actuation switch S1, transport bridge 8, starting from the FIG. 5 position, or from an intermediate position in between the fully extended position and the closed position, is moved back in the direction of the closed position. If the closed position is reached by this activity, the position responsive switch S2 moves from contact 28 to contact 27. A short-term negative impulse, acting as a resetting signal, is given to transistor base T1a via changeover contact S12, position responsive switch S2, lead 29, and condenser C3a. Transistor T1a is blocked. The high at the collector of transistor T1a energizes transistor T2a. The low signal at the collector of transistor T2a blocks transistor T3a via resistor R6a. Relay RS is released. The motor circuit is interrupted via relay rs. Cover 10 is stopped in the closed position.

In the switch arrangement in accordance with FIG. 2, diodes D8a and D8b bridge the respectively blocked, parallely connected transistors T3a or T3b. Diode D8a is polarized in the same direction as the emitter diode of transistor T3a, which applies correspondingly to the diode D8b and transistor T3b. Z-diodes D9 and D10 serve to effect bipolar spark quenching of the induced voltage when relay RS releases.

Figure 6:
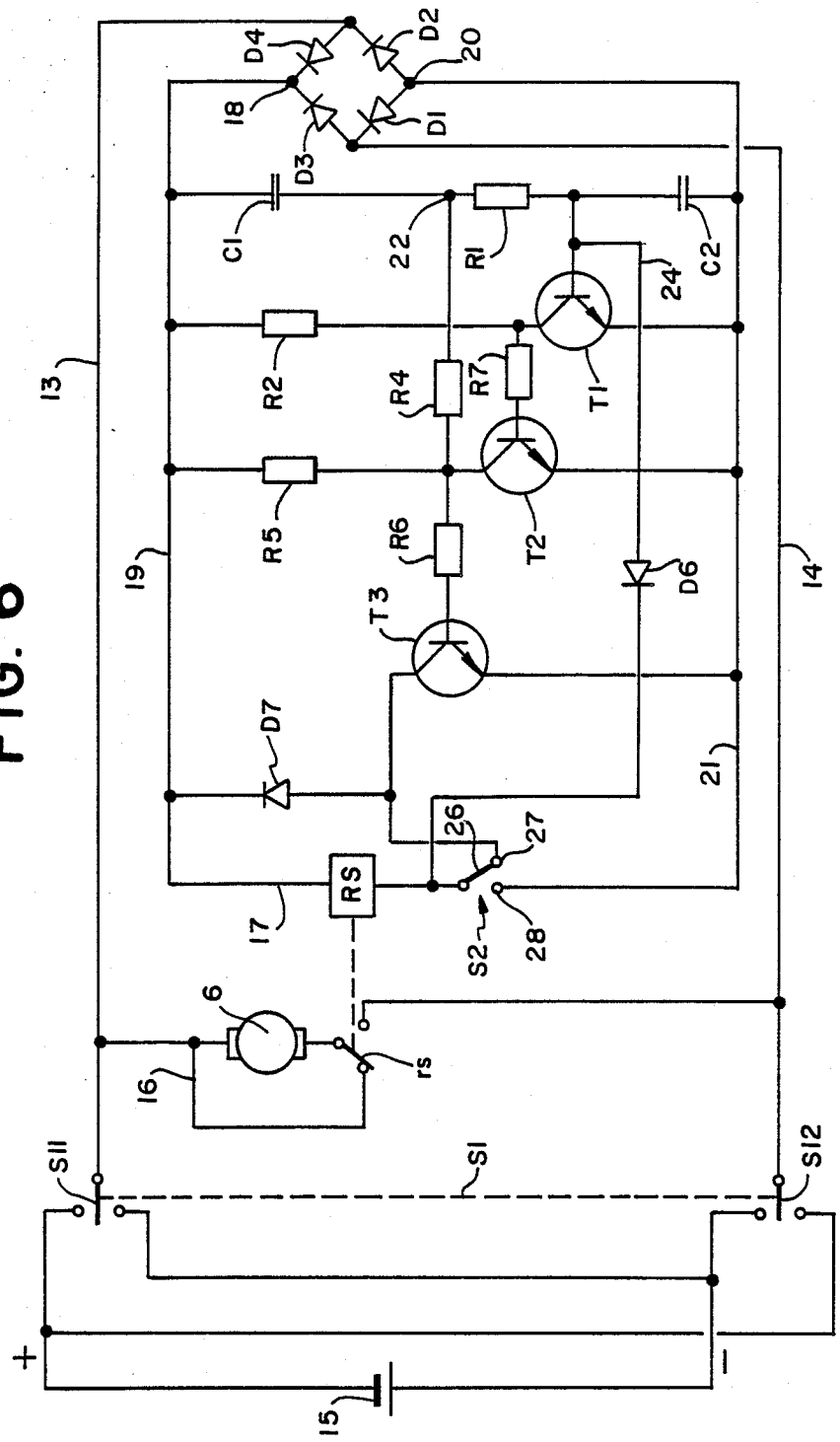
FIG. 6 is a circuit diagram of a further modified embodiment of the actuating device.

FIG. 6 shows another preferred embodiment of the invention. This embodiment corresponds directly with that of FIG. 1 except that, whereas in the embodiment of FIG. 1 the collector-emitter path of transistor T3, which defines the output circuit of the relay actuating stage, is connected in parallel to the position responsive switch S2, FIG. 6 illustrates a circuit embodiment in which the collector-emitter path of transistor T3 and the position responsive switch S2 are connected in series. In this embodiment switch S2 has a changeover contact 26 which, as long as cover 10 is in the reference position (closed position), engages a contact 27 and thereby connects the collector-emitter path of transistor T3 in series with the winding of relay RS. The changeover contact 26 changes to a contact 28, connected to line 21, after cover 3 has left the reference position.

When cover 10 is in a position other than the reference position and when, therefore, the changeover contact 26 engages contact 28, a reset signal is transmitted to transistor T1 through diode D6 and conduit 24. Transistor T3 is made non-conductive through T1 and T2. When actuation switch S1 is now actuated in one or the other direction, the transistor logic stage formed by transistors T1 and T2 is set so that transistor T3 becomes conductive. Therefore, current flows through the series connection consisting of the winding of relay RS, position responsive switch S2 and the collector-emitter path of transistor T3. Relay RS is energized; the motor 6 is switched on through relay contact rs. Motor 6 runs until either the actuation switch S1 is returned into its zero position or until the cover reaches the closed position and the position responsive switch S2 is changed over. In the latter case, again, a reset signal is applied to the base of transistor D1 through diode D6. In this embodiment also, diode D5 and resistor R3 may be omitted.

In all of the embodiments described, npn transistors are provided. It is to be understood, however, that the circuitry, in an analogous manner, can also be designed with pnp transistors. The examples according to FIGS. 1, 2 and 6 use discrete switch components. Basically, standardized integrated circuits can also be used instead; however, a circuit design using discrete switch components has the advantage that higher temperatures and higher voltages or voltage peaks can be tolerated. Discrete circuit components can also process higher currents, whereby disturbances which may occur in motor vehicles are rendered harmless. The disclosed circuit concept also permits a miniaturization by the use of SMD (i.e., surface mounted devices) components. At rest, i.e., with the actuating switch S1 in its O-position, the entire circuitry is without current in all design versions, so that no disturbances can be picked up by being coupled-in. The version according to FIGS. 1 and 6, moreover, have the advantage that the electronic relay stage is activated for the start-up movement out of the reference position only. Consequently, cover 10, having been brought out of its closed FIG. 4 position (retracted or extended), can always be closed by manual actuation of switch S1.

It is to be understood that the actuating device described is not limited to a specific kind of drive (transport bridge 8, lever 9), but can be used in connection with any other type of drive. Additionally, the actuating device can be used for various roof configurations, e.g., simple sliding roofs, simple lifting roofs, or so-called spoiler roofs, in which the roof is tilted from its closed position and subsequently is displaced rearwardly above the fixed roof surface. In the latter case, the reference position, used appropriately, is the fully extended cover position with the cover in its forward end position.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Actuating device for a movable part for the closure of apertures in vehicles, comprising: a reversible direct current drive motor for driving of the movable part; a polarity reversing actuating switch in a motor circuit for applying direct current to the motor circuit in a manner which, selectively, produces rotation of said motor in each of opposite rotational directions; a relay with a switch contact, connected in series with the polarity reversing actuating switch in the motor circuit; a position responsive stage connected to a control circuit of the relay for actuating the relay when said movable part is in a predetermined reference position for automatically deactivating the drive motor by opening the switch contact; wherein said relay is a direct current relay which, upon application of a first voltage level to its control circuit, closes the relay switch contact, and which, upon application of a second voltage level to its control circuit, opens the relay switch contact; and wherein an electronic relay actuating stage having a storage device is connected with the control circuit of the relay, which relay actuating stage, at least when said movable part is in the reference position, has a setting signal applied to its input side, said setting signal being caused by the closure of the polarity reversing actuating switch and being effective to cause the relay actuating stage to apply the first voltage level to the control circuit of the relay, said relay actuating stage being held as set by the setting signal, dependent upon the position of the movable part, at least until the movable part has left the reference position.

2. Actuating device according to claim 1, wherein the position responsive stage is operative for deenergizing said relay when the movable part enters the reference position, and wherein the relay switch contact is a normally open contact.

3. Actuating device according to claim 2, wherein the position responsive stage comprises a switch which assumes a fist switch position when the movable part is in the reference position, and assumes a second switch position when the movable part has been moved out of the reference position.

4. Actuating device according to claim 1, wherein the position responsive stage comprises a switch which assumes a first switch position when the movable part is in the reference position, and assumes a second switch position when the movable part has been moved out of the reference position.

5. Actuating device according to claim 4, wherein the position responsive switch is directly connected in series with a winding of the relay.

6. Actuating device according to claim 4, wherein the position responsive switch acts upon said relay via the electronic relay actuating stage.

7. Actuating device according to claim 1, wherein the relay actuating stage has at least one input that is connected with the polarity reversing actuating switch.

8. Actuating device according to claim 7, wherein the relay actuating stage has a locking loop which, after setting the relay actuating stage into a set mode, holds it in the set mode at least until the movable part has left the reference position.

9. Actuating device according to claim 7, wherein the relay actuating stage, together with the control circuit of the relay, is connected to the polarity reversing actuating switch in parallel to the motor circuit via a full wave rectifier.

10. Actuating device according to claim 1, wherein the relay actuating stage, together with the control circuit of the relay, is connected to the polarity reversing actuating switch in parallel to the motor circuit via a full wave rectifier.

11. Actuating device according to claim 10, wherein the position responsive stage includes a position responsive switch arranged to open when the movable part is in the reference position, and wherein the position responsive switch is connected with an input of the relay actuating stage via a diode, which diode is connected in a manner causing it to be blocked when the position responsive switch is open.

12. Actuating device according to claim 11, wherein the relay actuating stage is provided with a temperature drift compensating means for blocking the diode independent of temperature fluctuations, when the position responsive switch is open.

13. Actuating device according to claim 1, wherein the relay actuating stage has two circuit units which essentially mirror image each other, one unit of which responds to a closing of the polarity reversing actuating switch in one direction, and the other unit of which responds to a closing of the polarity reversing actuating switch in the opposite direction.

14. Actuating device according to claim 13, wherein the winding of the relay is connected in series, with opposite polarities, with an output side of a semiconductor switch of one circuit unit, and an output side of a semiconductor switch of the other circuit unit, and wherein a diode is connected anti-parallelly to the two output sides of the semiconductor switches.

15. Actuating device according to claim 13, wherein each of the two circuit units has a setting input which is directly connected with the polarity reversing actuating switch, and a resetting input connected to the position responsive stage.

16. Actuating device according to claim 15, wherein the winding of the relay is connected in series, with opposite polarities, with an output side of a semiconductor switch of one circuit unit, and an output side of a semiconductor switch of the other circuit unit, and wherein a diode is connected anti-parallelly to the two output sides of the semiconductor switches.

17. Actuating device according to claim 8, wherein the relay actuating stage has two circuit units which essentially mirror image each other, one unit of which responds to a closing of the polarity reversing actuating switch in one direction, and the other unit of which responds to a closing of the polarity reversing actuating switch in the opposite direction.

18. Actuating device according to claim 17, wherein each of the two circuit units has a setting input which is directly connected with the polarity reversing actuating switch, and a resetting input connected to the position responsive stage.

19. Actuating device according to claim 18, wherein the winding of the relay is connected in series, with opposite polarities, with an output side of a semiconductor switch of one circuit unit, and an output side of a semiconductor switch of the other circuit unit, and wherein a diode is connected anti-parallelly to the two output sides of the semiconductor switches.

20. Actuating device according to claim 1, wherein an output circuit for the relay actuating stage is connected in series with the relay actuating stage.

21. Actuating device according to claim 20, wherein the position responsive stage acts upon said relay via the electronic relay actuating stage; and wherein said position responsive stage has a changeover contact which connects the output circuit for the relay actuating stage in series with the winding of the relay when the movable part is in its reference position, and which closes a relay holding circuit including the polarity reversing actuating switch after the movable part has left the reference position.

22. Actuating device according to claim 1, wherein an output circuit of the relay actuating stage is connected in parallel to the relay actuating stage.

23. A vehicle roof of the type having an aperture in a fixed roof surface, a movable closure part for selectively closing and at least partially opening said aperture, and an actuating device for said closure part, said actuating device comprising: a reversible direct current drive motor for driving said movable closure part; a polarity reversing actuating switch in a motor circuit for applying direct current to the motor circuit in a manner which, selectively, produces rotation of said motor in each of opposite rotational directions; a relay with a switch contact, connected in series with the polarity reversing actuating switch in the motor circuit; a position responsive stage connected to a control circuit of the relay for actuating the relay when said movable closure part is in a predetermined reference position for automatically deactivating the drive motor by opening the switch contact; wherein said relay is a direct current relay which, upon application of a first voltage level to its control circuit, closes the relay switch contact, and which, upon application of a second voltage level to its control circuit, opens the relay switch contact; and wherein an electronic relay actuating stage having a storage device is connected with the control circuit of the relay, which relay actuating stage, at least when said movable closure part is in the reference position, has a setting signal applied to its input side, said setting signal being caused by the closure of the polarity reversing actuating switch and being effective to cause the relay actuating stage to apply the first voltage level to the control circuit of the relay, said relay actuating stage being held as set by the setting signal, dependent upon the position of the movable part, at least until the movable part has left the reference position.

* * * * *